United States Patent [19]

Austin et al.

[11] 4,067,833

[45] Jan. 10, 1978

[54] URETHANE-MODIFIED POLYISOCYANURATE FOAMS FROM OXYALKYLATED ANILINE AND AROMATIC POLYISOCYANATES

[75] Inventors: Thomas H. Austin; George P. Speranza, both of Austin, Tex.

[73] Assignee: Texaco Development Corporation, New York, N.Y.

[21] Appl. No.: 664,465

[22] Filed: Mar. 8, 1976

[51] Int. Cl.$^2$ ............................................. C08G 18/28
[52] U.S. Cl. ......................... 260/2.5 AQ; 260/2.5 AW
[58] Field of Search ..................... 260/2.5 AW, 2.5 AQ

[56] References Cited

U.S. PATENT DOCUMENTS

| 3,644,232 | 2/1972 | Bernard et al. | 260/2.5 AW |
| 3,933,698 | 1/1976 | Fuzesi et al. | 260/2.5 AQ |

*Primary Examiner*—Eugene C. Rzucidlo
*Attorney, Agent, or Firm*—Carl G. Ries; Thomas H. Whaley; James L. Bailey

[57] ABSTRACT

Covers novel urethane-modified polyisocyanurate rigid foams comprising the reaction product obtained by bringing together in the presence of a blowing agent an aromatic polyisocyanate, an isocyanurate group formation catalyst, and a polyol comprising a specific alkylene oxide adduct of aniline. The novel foams are useful in preparing rigid foam material such as panels, slabs, or sprayed foam surfaces.

6 Claims, No Drawings

URETHANE-MODIFIED POLYISOCYANURATE FOAMS FROM OXYALKYLATED ANILINE AND AROMATIC POLYISOCYANATES

BACKGROUND OF THE INVENTION

1. Field of the Invention

This invention pertains to the field of urethane-modified polyisocyanurate rigid foams. More particularly, this invention pertains to the use of specific polyols utilized in preparing the said foams.

2. Description of the Prior Art

Urethane-modified polyisocyanurate rigid foams are known in the art. Such foams are prepared by reacting a polyol, polyisocyanate and optionally other ingredients in the presence of a blowing agent. An isocyanurate group formation catalyst is used to trimerize the isocyanate groups to form the isocyanurate linkages. The polyol essentially acts as a modifying or reactive plasticizing agent in the overall polymeric scheme since a polymer containing only isocyanurate groups is itself too friable. Thus, the isocyanurate foam contains both isocyanurate groups as well as urethane linkages, with said urethane linkages acting to plasticize the foam. Initially, the reaction proceeds to give a urethane adduct containing active isocyanate groups which during subsequent reaction, trimerize to give a polymer rich in isocyanurate linkages.

Some main uses of the resultant foam include those of thermal insulation, and as building materials and the like. Examples of some prior art isocyanurate foams and methods of preparation are described in U.S. Pat. Nos. 3,745,133; 3,644,232; 3,676,380; 3,168,483; and 3,519,950, to name a few.

However, many known polyisocyanurate foams have one or more disadvantages. In particular, rigid foams of this type often have high friability or propensity to break. Efforts to reduce friability have often resulted in sacrifice of thermal stability and flammability resistance. Lack of flammability resistance is particularly characterized by flame spreadability. Yet other prior art polyisocyanurate foams have suffered from the disadvantages of poor adhesiveness, irregular cell structure and the like.

We have now found that it is now possible to prepare modified polyisocyanurate foams that do not exhibit any of the aforesaid disadvantages. We have particularly found that urethane-modified polyisocyanurate foams can be prepared having low friability and good flammability resistance. Such are achieved without sacrifice of other sought-after properties such as thermal stability.

SUMMARY OF THE INVENTION

The present invention is an improved modified cellular polyisocyanurate comprised of the reaction product formed by bringing together in the presence of an inert blowing agent, and an isocyanurate group formation catalyst, an aromatic polyisocyanate and a polyol comprising an alkylene oxide adduct of aniline. The rigid foams exhibit surprisingly low friability and good flammability resistance.

DETAILED DESCRIPTION OF THE INVENTION

The modified isocyanurate foams of the present invention in rigid foam form are prepared by mixing in the presence of an inert blowing agent and an isocyanurate group formation catalyst, an aromatic polyisocyanate and a polyol comprising an alkylene oxide adduct of aniline prepared by reacting 2.5–15 moles of alkylene oxide per mole of aniline. The mixing is carried out under conventional foaming conditions utilizing conventional mixing devices employed in the manufacture of polymer foams. The mixing of the materials for the formation of the reaction product is not critical to the invention. Examples of conventional polymer foam formation processes and equipment are described in Ferrigno, "Rigid Plastic Foams", Reinhold Publishing Corporation, New York, New York, 1963.

The polyols utilized here comprise oxide adducts of aniline. The polyether polyols are thus the oxyalkylation products of an alkylene oxide and aniline acting as an initiator. The oxyalkylating agents comprising alkylene oxides are those having from 2 to 4 carbon atoms, and more preferably, the 1,2-epoxides having 2 to 3 carbon atoms, i.e. ethylene oxide and propylene oxide.

The oxyalkylated aniline products or polyether polyols of aniline are achieved by the utilization of a specific alkylene oxide or alkylene oxide mixtures in specific quantities, namely 2.5–15 moles of alkylene oxide per mole of aniline. While the hydroxyl number and viscosities of the final aniline polyol product is determined by various factors such as temperature of reaction and other process parameters, to a large extent the characteristics of the final aniline polyol are determined by the particular oxyalkylating agent used, its manner of addition to the reaction media, and the quantities used. The alkylene oxide addition is therefore somewhat empirical and depends upon factors such as the product desired, the alkylene oxide used, the method of addition, the order of addition, and the temperatures at which the alkylene oxides are added. For example, the alkylene oxide reagent can be added to aniline in either a heteric or a blocked manner or a combination thereof. It is essential however, as will be shown later that the quantities of alkylene oxide used as reactant be within the just mentioned molar limits.

When blocked addition of aniline is sought, as an example, ethylene oxide may be first added to aniline and then propylene oxide added. Various addition methods yield products of the desired viscosity range with desirable hydroxy numbers. For example, heteric-type addition can be used wherein a mixture of ethylene oxide and propylene oxide is added. Further, the relative concentrations of ethylene oxide and propylene oxide may be varied in the mixture as the reaction progresses. For example, an ethylene oxide rich mixture may be initially metered into the reaction mixture. As the addition progresses, the relative concentration of propylene oxide may be increased. This can be accomplished with, for example, a valved mixing nozzle which is progressively regulated.

A preferred polyoxyalkylene polyol of aniline here is the ethylene oxide adduct of aniline. Most preferably, the polyol utilized here is an ethylene oxide adduct of aniline prepared by reacting 2.5–15 moles of ethylene oxide per mole of aniline. Other preferred polyols are the propylene oxide or mixed ethylene oxide/propylene oxide adducts of aniline again prepared by reaction of 2.5–15 moles of oxide or mixed oxide per mole of aniline.

In order to prepare rigid urethane-modified polyisocyanurate foams, the aniline polyol should have a hydroxyl number ranging from about 150 to 1,000.

More preferred polyols of this type have a hydroxyl number of about 150–625, more often 200–600.

The hydroxyl number is defined as the number of milligrams of potassium hydroxide required for the complete neutralization of the hydrolysis product of the fully acetylated derivative prepared from one gram of polyol. The hydroxyl number can also be defined by the equation:

$$OH = (56.1 \times 1,000 \times F)/MW$$

where

OH = hydroxyl number of the polyol
F = average functionality, that is, the average number of hydroxyl groups per molecule of polyol.
MW = average molecular weight of the polyol.

An aromatic polyisocyanate may be used in the practice of the instant invention. Typical aromatic polyisocyanates include m-phenylene diisocyanate, p-phenylene diisocyanate, polymethylene polyphenylisocyanate, 2,4-tolylene diisocyanate, 2,6-tolylene diisocyanate, dianisidine diisocyanate, bitolylene diisocyanate, naphthalene-1,4-diisocyanate, diphenylene-4,4'-diisocyanate, aliphatic-aromatic diisocyanates, such as xylene-1,4-diisocyanate, xylylene-1,3-diisocyanate, bis(4-isocyanatophenyl) methane, bis (3-methyl-4-isocyanatophenyl)methane, and 4,4'-diphenylpropane diisocyanate.

Greatly preferred aromatic polyisocyanates used in the practice of the invention are methylene-bridged polyphenyl polyisocyanate mixtures. These latter isocyanate compounds are generally produced by the phosgenation of the corresponding methylene-bridged polyphenyl polyamines, which are conventionally produced by the reaction of formaldehyde and primary aromatic amines, such as aniline, in the presence of hydrochloric acid and/or other acidic catalysts. Known processes for preparing the methylene-bridged polyphenyl polyamines and corresponding methylene-bridged polyphenyl polyisocyanates therefrom are described in the literature and in many patents, for example, U.S. Pat. Nos. 2,683,730; 2,950,263; 3,012,008; 3,344,162; and 3,362,979.

Most preferred methylene-bridged polyphenyl polyisocyanate mixtures used here contain from about 20 to about 100 weight percent methylene diphenylisocyanate isomers with the remainder being polymethylene polyphenyl isocyanates having higher functionalities and higher molecular weights. Typical of these are polyphenyl polyisocyanate mixtures containing about 20 to 100 weight percent methylene diphenylisocyanate isomers, of which 3 to about 25 weight percent thereof is the 2,4'-isomer, with the remainder being polymethylene polyphenyl polyisocyanates of higher molecular weight and functionality that have an average functionality of from about 2.1 to about 3.5. The isocyanate mixtures are known, commercially available materials and can be prepared by the process described in U.S. Pat. No. 3,362,979, issued Jan. 9, 1968 to Floyd E. Bentley, and in the patents such as those referred to in the preceding paragraph.

Foaming is accomplished by employing in a minor amount (for example, from about 0.5 to 25 weight percent, based on total weight of the reaction mixture), of blowing agents which are vaporized by the exotherm of the isocyanato-reactive hydrogen reaction. The preferred blowing agents are certain halogen-substituted aliphatic hydrocarbons which have boiling points between about −40° C. and 70° C., and which vaporize at or below the temperature of the foaming mass. The blowing agents include, for example, trichloromonofluoromethane, dichlorodifluoromethane, dichloromonofluoromethane, dichloromethane, trichloromethane, bromotrifluoromethane, chlorodifluoromethane, chloromethane, 1,1-dichloro-1-fluoroethane, 1,1-difluoro-1,2,2-trichloroethane, chloropentafluoroethane, 1,-chloro-1-fluoroethane, 1-chloro-2-fluoroethane, 1,1,2-trichloro-1,2,2-trifluoroethane, 1,1,1-trichloro-2,2,2-trifluoroethane, 2-chloro-1,1,1,2,3,3,4,4,4,-nonafluorobutane, hexafluorocyclobutene, and octofluorocyclobutane. Other useful blowing agents include water and low-boiling hydrocarbons such as butane, pentane, hexane, cyclohexane, and the like. Many other compounds easily volatilized by the exotherm of the isocyanato-reactive hydrogen reaction also can be employed. A further class of blowing agents includes the thermally unstable compounds which liberate gases upon heating, such as N,N'-dimethyl-N,N'-dinitrosoterephthalamide.

The amount of blowing agent used will vary with the density desired in the foamed product. In general it may be stated that for 100 grams of reaction mixture containing an average isocyanate/reactive hydrogen ratio of about 1:1, about 0.005 to 0.3 mole of gas is used to provide densities ranging from 30 to 1 pound per cubic foot respectively.

The isocyanurate group formation catalyst or catalysts employed to promote trimerization may be chosen from a variety of known materials. Such catalysts include strong bases, alkali metal salts of carboxylic acids, non-basic metal salts of carboxylic acids and aliphatic tertiary amines. For example, suitable strong bases include quaternary ammonium hydroxide, alkali metal hydroxide, and alkali metal alkoxides. Suitable alkali metal salts of carboxylic acids include, for example, sodium acetate, potassium octoate, potassium acetate, sodium benzoate, and the like. Examples of suitable tertiary amines are N,N'-diethylpiperazine, N,N'-dimethylpiperazine, trialkylamines such as trimethylamine, triethylenediamine, tributylamine, 2,4,6-tris(dimethylaminomethyl)phenol, and N,N',N''-tris(dimethyl 3-aminopropyl)-s-hexhydrotriazine and the like.

The particular amount of catalyst employed can vary over a wide range and is not critical so long as it is present in an amount sufficient to promote trimerization of the isocyanate mixture. Preferably, the catalyst is added in an amount of about 0.0005 to about 0.025 equivalents for each equivalent of isocyanate employed. An optimum amount would be from about 0.001 to about 0.01 equivalents per equivalent of isocyanate. Expressed in other terms, the catalyst is preferably added in an amount of from about 0.03 up to about 5.0 parts by weight, based upon the total foam formulation, i.e. 100 parts by weight.

Though not necessary as will be seen hereafter, the isocyanurate foams of the invention can be formulated to include flame retardant components to improve the fire retardancy of the foams. Any known fire retardant component compatible with rigid isocyanurate foams can be employed. This would include both the reactive and additive type fire retardants. Representatives of the additive types include halogenated organic phosphates such as tris(chloroethyl)phosphate, tris(2,3-dibromopropyl)phosphate, triphenyl phosphite, diammonium phosphate, and antimony oxide. Representatives of the chemically bound types are diethyl-N,N'-bis(2-hydroxyethyl)aminomethyl phosphonate, chlorendic acid derivatives, and phosphorous-containing polyols. When employed, the fire retardant component is added to the above-described isocyanate mixture with some other component or as a preformed mixture with some other component described hereinbefore, in an amount of about 1 to about 20 weight percent of the total foam formulation.

Furthermore, fillers can be employed in the preparation of the isocyanurate foams, if desired in amounts within the range of about 0.1 to about 20 weight percent of the total foam formulation. Any conventional filler known in the art to be compatible with isocyanurate foam manufacture can be employed, such as hydrated alumina, polyethylene, aluminum powder, and various clays and talcs.

An emulsifier or stabilizing agent may also be used in the preparation of the isocyanurate foams of this invention including, for example, sulfonated castor oil or the like. One preferred foam stabilizer is that based on silicone such as, for example, a polydimethyl siloxane or a polyoxyalkylene block co-polymer of a silane. The latter type of silicone oil is disclosed in U.S. Pat. No. 2,834,748. Other surfactants or emulsifying or dispersing agents which may be used include ethylene oxide modified sorbitan, monopalmitate or ethylene oxide modified polypropylene ether glycol.

The amount of aniline polyether polyol employed in relation to the organic aromatic polyisocyanate is not critical, but preferably ranges in an amount of from about 0.1 to about 0.8 equivalent per equivalent of polyisocyanate. Optimally, about 0.16 to about 0.6 equivalent per equivalent of polyisocyanate is employed. Moreover, the polyol can be added to the polyisocyanate as a separate component or as a preformed mixture with one or more of the other components.

To prepare the isocyanurate foams of the invention, the above discussed ingredients may be simultaneously, or independently intimately mixed with each other by the so-called "one-shot" method to provide a foam by a one-step process. Proportions of ingredients are properly adjusted to give rigid foams. In addition to the "one-shot" method the "quasi-prepolymer method" may also be employed though it is not preferred due to stability problems. Here, a portion of the polyol is reacted in the absence of a catalyst with the polyisocyanate component. Thereafter to prepare a suitable foam, the remaining portion of the polyol is added and reaction allowed to go to completion in the presence of catalyst along with other appropriate additives such as blowing agents, foam stabilizing agents, fire retardants, etc.

Again, the isocyanurate foams of the present invention may be prepared over a wide range of temperatures. However, normally, the reaction is initiated at room temperature, and the only heat involved is that generated by the polymerization itself.

It was surprising and unexpected that a diol of the type prepared here yields a rigid foam with good dimensional stability, since in conventional polyurethane foams a higher functionality polyol is required. It was also surprising that the polyisocyanurate foams made from this diol had adequate dimensional stability under elevated temperature aging and yet still had low friability. For example, the propylene oxide adduct of sorbitol has an undesirably high friability when used as a polyol source in preparing rigid polyisocyanurate foams.

It was also surprising that the aniline polyether polyols described here are useful in preparing rigid foams.

Normally one would predict that a higher functionality polyol would be required to prepare good rigid foams. Additionally, one would predict that to prepare an acceptable rigid foam, a polyol source should be employed having only about one ether group per hydroxyl group. Here, in the practice of the invention involving preparation of a polyol from 2.5-15 moles of alkylene oxide per mole of aniline, multiple ether groups per hydroxyl group are present in the resultant molecule. One would then expect that such a molecule would be too flexible to prepare a suitable rigid foam.

The invention will be illustrated further with respect to the following specific examples, which are given by way of illustration and not as limitations on the scope of this invention.

EXAMPLES 1-4

Here, preferred polyols of the invention were first prepared. These consisted of ethylene oxide adducts of aniline varied by adjusting the ratio of ethylene oxide to aniline. Table I below lists these polyols and their characteristics.

TABLE I

| Polyol No. | ETHYLENE OXIDE PER MOLE Moles Aniline | OH# | Eq. Wt. | Vis., cps, 25° C |
|---|---|---|---|---|
| 1 | 10 | 208 | 270 | 294 |
| 2 | 8.5 | 237 | 237 | 326 |
| 3 | 6.5 | 291 | 193 | 394 |
| 4 | 2.5 | 567 | 99 | — |

EXAMPLE 5

In this example, a 200 g. handmix box pour foam was made to determine foaming behavior utilizing a typical aniline polyol. A pre-blended B-component was combined with the isocyanate (A-component), stirred 2 seconds and poured. Stirring was accomplished with a drill press motor with an attached stirrer made by assembling one Conn IT mixer and two medium lift impellers on a steel shaft. The reactivity values were recorded as follows: cream time (CT), 3 seconds; tack free time (TF), 17 seconds; rise time (RT), 26 seconds.

The formulation of this rigid foam is shown below:

| B-Component | PBW |
|---|---|
| Polyol No. 1 | 22.5 |
| DC-193 Silicone[1] | 0.5 |
| Potassium Octoate[2] | 1.0 |
| DMAPAT[3] | 1.0 |
| FYROL CEF[4] | 6.0 |
| R-11B[5] | 12.0 |
| A-Component | |
| THANATE ® P-270[6] | 57.0 |

[1]Silicone-polyether; Dow Corning Corporation
[2]Potassium octoate was prepared from potassium hydroxide (1.0 mole) and 2-ethylhexanoic acid (1.1 mole) as a 50% solution in a propylene oxide adduct of glycerine, molecular weight 700; Jefferson Chemical Company, Inc.
[3]Tris[N,N-dimethyl-3-aminopropyl]sym hexahydro triazine.
[4]Tris(chloroethyl) phosphate; Stauffer Chemical Company.
[5]Trichloromonofluoromethane, E. I. duPont de Nemours and Company.
[6]Methylene-bridged polyphenyl polyisocyanate mixture containing about 46 percent by weight methylene diphenyl isocyanate isomers, of which about 20 percent is the 2,4'-isomer, and the remainder higher functionality and higher molecular weight polymethylene polyisocyanates which have an average functionality of about 2.7.

EXAMPLES 6-29

Here, 600 g. hand-mix box pours were made to provide sufficient foam for testing. Preparation followed the directions outline in Example 5 utilizing various polyols of Examples 1–4. Table II below outlines these results.

layer and multi-layer foams were made. As can be seen from Table III below, rigid foams having excellent

TABLE II

| Example No. | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|
| Formulation, pbw | | | | | | | | | | | | | | | |
| B-Component | | | | | | | | | | | | | | | |
| Polyol* | 24.0 | 21.0 | 16.9 | 14.0 | 24.2 | 21.2 | 17.0 | 14.1 | 22.3 | 19.4 | 15.6 | 13.0 | 22.5 | 19.6 | 15.8 |
| DC-193 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Potassium octoate | 1.6 | 1.6 | 1.6 | 1.6 | 1.0 | 1.0 | 1.0 | 1.0 | 1.6 | 1.6 | 1.6 | 1.6 | 1.0 | 1.0 | 1.0 |
| DMAPAT | — | — | — | — | 1.0 | 1.0 | 1.0 | 1.0 | — | — | — | — | 1.0 | 1.0 | 1.0 |
| FYROL CEF | — | — | — | — | — | — | — | — | 6.0 | 6.0 | 6.0 | 6.0 | 6.0 | 6.0 | 6.0 |
| R-11B | 12.0 | 12.0 | 12.0 | 12.0 | 12.0 | 12.0 | 12.0 | 12.0 | 12.0 | 12.0 | 12.0 | 12.0 | 12.0 | 12.0 | 12.0 |
| A-Component | | | | | | | | | | | | | | | |
| THANATE® P-270 | 61.9 | 64.9 | 69.0 | 71.9 | 61.3 | 64.3 | 68.5 | 71.4 | 57.6 | 60.5 | 64.3 | 66.9 | 57.0 | 59.9 | 63.7 |
| NCO/OH index | 5.0 | 6.0 | 8.0 | 10.0 | 5.0 | 6.0 | 8.0 | 10.0 | 5.0 | 6.0 | 8.0 | 10.0 | 5.0 | 6.0 | 8.0 |
| Reactivity, sec., CT | 4 | 4 | 4 | 4 | 4 | 4 | 4 | 4 | 4 | 4 | 4 | 4 | 4 | 4 | 4 |
| RT | 27 | 35 | 38 | 35 | 26 | 20 | 28 | 30 | 35 | 37 | 27 | 35 | 25 | 26 | 25 |
| Foam Properties | | | | | | | | | | | | | | | |
| Density, pcf | 1.98 | 1.97 | 2.15 | 2.30 | 2.02 | 1.95 | 2.06 | 2.26 | 1.95 | 2.08 | 2.37 | 2.26 | 1.98 | 2.24 | 2.15 |
| Closed cells, % | 92.5 | 92.7 | 91.6 | 90.6 | 91.3 | 92.1 | 91.8 | 90.7 | 92.3 | 92.6 | 91.2 | 90.6 | 92.5 | 90.7 | 88.2 |
| K-Factor | .126 | .135 | .126 | .139 | .102 | .119 | .133 | .125 | .119 | .124 | .123 | .134 | .114 | .120 | .137 |
| Heat distortion, °C. | 215 | 191 | >225 | 179 | 184 | 212 | 223 | >225 | 171 | 194 | 180 | >225 | 143 | 212 | 162 |
| Friability, % | 18 | 14 | 34 | 50 | 5 | 15 | 39 | 43 | 19 | 27 | 55 | 65 | 14 | 37 | 53 |
| Compressive strength, psi | | | | | | | | | | | | | | | |
| With rise | 39 | 36 | 34 | 35 | 37 | 35 | 33 | 34 | 36 | 34 | 36 | 32 | 36 | 37 | 31 |
| Cross rise | 11 | 12 | 16 | 21 | 12 | 12 | 14 | 15 | 10 | 11 | 16 | 18 | 12 | 13 | 13 |
| Dimensional stability | | | | | | | | | | | | | | | |
| 1 week ΔV | | | | | | | | | | | | | | | |
| 158° F., 100% R.H. | 5 | 5 | 4 | 3 | 5 | 6 | 5 | 4 | 5 | 7 | 4 | 4 | 5 | 6 | 5 |
| Butler Chimney | | | | | | | | | | | | | | | |
| % wt. retained | 91.4 | 91.4 | 94.7 | 95.0 | 89.2 | 89.8 | 92.5 | 93.6 | 95.4 | 96.0 | 96.6 | 96.8 | 95.3 | 95.5 | 95.1 |
| Flame height, in. | 9.7 | 8.5 | 6.3 | 5.7 | >11 | 9.1 | 6.8 | 6.2 | 4.5 | 4.3 | 3.7 | 3.2 | 4.5 | 4.2 | 4.5 |

| Example No. | 21 | 22 | 23 | 24 | 25 | 26 | 27 | 28 | 29 |
|---|---|---|---|---|---|---|---|---|---|
| Formulation, pbw | | | | | | | | | |
| B-Component | | | | | | | | | |
| Polyol* | 13.1 | 21.6 | 21.8 | 20.2 | 20.0 | 19.0 | 17.5 | 19.0 | 17.6 |
| DC-193 | 0.5 | 0.5 | 0.5 | 0.5 | 0.5 | 0.5 | 0.5 | 0.5 | 0.5 |
| Potassium octoate | 1.0 | 1.6 | 1.0 | 1.6 | 1.0 | 0.8 | 0.8 | 1.2 | 1.2 |
| DMAPAT | 1.0 | — | 1.0 | — | 1.0 | 0.8 | 0.8 | — | — |
| FYROL CEF | 6.0 | — | — | 6.0 | 6.0 | — | 6.0 | — | 6.0 |
| R-11B | 12.0 | 12.0 | 12.0 | 12.0 | 12.0 | 12.0 | 12.0 | 12.0 | 12.0 |
| A-Component | | | | | | | | | |
| THANATE® P-270 | 66.4 | 64.3 | 63.7 | 59.9 | 59.3 | 66.9 | 62.4 | 67.3 | 62.7 |
| NCO/OH index | 10.0 | 5.0 | 5.0 | 5.0 | 5.0 | 5.0 | 5.0 | 5.0 | 5.0 |
| Reactivity, sec., CT | 4 | 4 | 4 | 4 | 3 | 4 | 5 | 5 | 5 |
| RT | 26 | 30 | 26 | 40 | 25 | 35 | 45 | 40 | 50 |
| Foam Properties | | | | | | | | | |
| Density, pcf | 2.21 | 2.05 | 2.02 | 2.03 | 1.93 | 1.93 | 1.96 | 1.97 | 2.03 |
| Closed cells, % | 89.9 | 93.5 | 94.1 | 92.6 | 92.2 | 90.9 | 89.9 | 89.5 | 89.5 |
| K-Factor | .132 | .121 | .117 | .119 | .121 | .124 | .121 | .133 | .126 |
| Heat distortion, °C. | >225 | 183 | 209 | 146 | 199 | 209 | 201 | >225 | 196 |
| Friability, % | 57 | 11 | 6 | 15 | 13 | 12 | 18 | 34 | 29 |
| Compressive strength, psi | | | | | | | | | |
| With rise | 22 | 42 | 36 | 39 | 39 | 43 | 42 | 38 | 37 |
| Cross rise | 11 | 14 | 13 | 12 | 11 | 14 | 12 | 17 | 13 |
| Dimensional stability | | | | | | | | | |
| 1 week ΔV | | | | | | | | | |
| 158° F., 100% R.H. | 4 | 7 | 7 | 8 | 8 | 4 | 8 | 4 | 6 |
| Butler Chimney | | | | | | | | | |
| % wt. retained | 96.0 | 94.1 | 91.8 | 95.1 | 97.3 | 84.6 | 91.0 | 88.7 | 93.5 |
| Flame height, in. | 4.0 | 6.6 | 9.0 | 4.9 | 5.0 | 10 | 6.3 | 8.0 | 5.7 |

*Polyol No. 1 used in Examples 6–21; Polyol No. 2 used in Examples 22–25; and Polyol No. 3 used in Examples 26–29.

EXAMPLES 30–32

Here, foams were prepared using a commercial spray machine, namely, a Gusmer Spray Machine. Both single layer and multi-layer foams were made. As can be seen from Table III below, rigid foams having excellent friabilities and flammability resistance were prepared.

TABLE III

| Example No. | 30 | | 31 | | 32 | |
|---|---|---|---|---|---|---|
| Formulation, pbw | B | A | B | A | B | A |
| Polyol 3 | 16.7 | | — | | 15.3 | |
| Polyol 2 | — | | 19.2 | | — | |
| DC-193 | 0.5 | | 0.5 | | 0.5 | |
| Potassium octoate | 1.2 | | 1.5 | | 2.0 | |
| DMAPAT | 1.2 | | 1.5 | | 1.5 | |
| R-11B | 12.0 | | 10.0 | | 14.0 | |
| FYROL CEF | | 6.0 | | 6.0 | | 6.0 |
| THANATE® P-270 | | 60.4 | | 57.3 | | 60.7 |
| NCO/OH index | | 4.82 | | 5.25 | | 5.55 |
| Machine Conditions | | | | | | |

TABLE III-continued

| Example No. | 30 | | 31 | | 32 | |
|---|---|---|---|---|---|---|
| Pump size | 30 | 60 | 30 | 60 | 30 | 60 |
| Line pressure | 800 | 400 | 400 | 700 | 400 | 800 |
| Temp., °F., block | 125 | | 140 | | 100 | |
| Nozzle size | 55 | | 55 | | 55 | |
| Viscosity, cps, 25° C. B/A | 50/120 | | 70/100 | | 40/200 | |
| Specific grav., 25° C. B/A | 1.2371/1.2655 | | 1.2132/1.2705 | | 1.2508/1.2555 | |
| Foam Properties | Single Layer | Multi-Layer | Single Layer | Multi-Layer | Single Layer | Multi-Layer |
| Density, pcf | | 2.13 | | 2.42 | | 2.83 |
| Closed cells, % | 93.2 | 93.9 | 93.6 | 93.4 | 92.9 | 90.4 |
| K-Factor | .119 | .134 | .108 | .138 | .124 | .145 |
| Heat distortion, °C. | | 204 | | >225 | | >225 |
| Friability, % | | 4 | | 7 | | 9 |
| Compressive strength | | | | | | |
| With rise, psi | | 26 | | 22 | | 27 |
| Cross rise, psi | | 17 | | 19 | | 36 |
| Dimensional stability | | | | | | |
| 1 week volume change | | | | | | |
| 158° F., 100% rel. hum. | 6 | 8 | 5 | 6 | 5 | 3 |
| Butler Chimney | | | | | | |
| % wt. retained | 94.0 | 88.6 | 94.6 | 95.9 | 94.5 | 94.6 |
| Flame height, in. | 4.7 | 4.8 | 4.3 | 4.4 | 4.4 | 5.4 |
| Monsanto Tunnel | | | | | | |
| Flame spread | 46 (57)* | 43 (57) | 41 (57) | — | 45 (56) | 52 (56) |
| % wt. loss | 4.8 (12.1) | 13.9 (12.1) | 9.7 (12.1) | — | 9.6 (11.6) | 9.8 (11.6) |

*Values in parenthesis represent the results from burning a standard control sample. The foam used as comparison was a typical commercial isocyanurate foam with an ASTM-E 84 flame spread rating of 25.

EXAMPLES 33-34

Here it was shown that the amount of alkylene oxide used to alkoxylate aniline is critical to prepare a suitable polyol useful in making isocyanate foams of acceptable quality, and particularly of low friability.

Specifically a non-inventive aniline polyol was prepared by reacting 2.0 moles of propylene oxide with one mole of aniline. The polyol had an hydroxyl No. of 552, an equivalent weight of 102 and a viscosity, in cps at 25° C of 120,000. This polyol was used to prepare an isocyanurate foam and compared to foam made using Polyol No. 4 (2.5 moles ethylene oxide/mole aniline). Foam properties are given in Table IV below from the two foams prepared by 200 g. hand-mix box pours.

TABLE IV

| EXAMPLE NO. | 33 | 34 |
|---|---|---|
| Formulation, pbw | | |
| Non-inventive Polyol | 10.0 | |
| Polyol 4 | | 10.0 |
| DC-193 | 0.5 | 0.5 |
| Potassium Octoate | 1.0 | 1.0 |
| DMAPAT | 1.0 | 1.0 |
| FYROL CEF | 6.0 | 6.0 |
| R-11B | 12.0 | 12.0 |
| MONDUR MR | 69.5 | 69.5 |
| NCO/OH Index | 5.27 | 5.13 |
| CT, sec. | 7 | 5 |
| TF, sec. | 8 | 15 |
| RT, sec. | 90 | 25 |

The foams of Examples 33 and 34 were then visually compared. Foam of Example 33 exhibited excessive initial surface friability and high internal friability. The foam of Example 34 showed very slight surface friability and had excellent cell structure.

It was particularly interesting to note that the friability values from foams prepared using commercial equipment, and particularly a commercial rigid spray foam machine, had friability values substantially lower than those foams prepared by hand-mixing. This is a definite advantage. It should also be pointed out that the polyols of the instant invention have a sufficiently low viscosity to be usefully employed in a spray machine of the type used in the test here. Normally, the maximum usable B-component viscosity should be less than about 1,000 cps on a machine of this type.

In addition to low friability and good flammability resistance, the urethane modified polyisocyanurate foams of the invention possess other advantages. For example, the compatability of the aniline polyols in fluorocarbons is good. This is an important advantage in that the percent fluorocarbon in a typical B-component is relatively high in an isocyanurate formulation. Also, rigid foams prepared in the manner described above have fine, even cell structure. Further, utilizing the aniline diols described herein, a surprisingly dimensionally stable foam is produced. Lastly, the rigid foams here have a high heat distortion temperature.

As can be seen from the above, rigid foams, and particularly sprayed rigid foams prepared as described here have excellent foam properties, making them useful in a variety of applications such as for insulation and the like.

We claim:

1. A urethane-modified polyisocyanurate rigid foam comprising the reaction product obtained by bringing together in the presence of a blowing agent an aromatic polyisocyanate, and an isocyanurate group formation catalyst and a polyol comprising an alkylene oxide adduct of aniline prepared by reacting 2.5-15 moles of alkylene oxide per mole of aniline, with the ratio of said polyol to said aromatic polyisocyanate being 0.1-0.8 equivalent: 1.0 equivalent.

2. The rigid foam of claim 1 wherein said polyol is an ethylene oxide adduct of aniline.

3. The rigid foam of claim 2 wherein said polyol is a propylene oxide or mixed ethylene oxide/propylene oxide adduct of aniline.

4. A process for preparing a urethane-modified polyisocyanurate rigid foam comprising the steps of mixing and reacting in the presence of a blowing agent and an isocyanurate group formation catalyst an aromatic polyisocyanate and a polyol comprising an alkylene oxide adduct of aniline prepared by reacting 2.5-15 moles of alkylene oxide per mole of aniline, with the ratio of said polyol to said aromatic polyisocyanate being 0.1-0.8 equivalent: 1.0 equivalent.

5. The process of claim 4 wherein said polyol is an ethylene oxide adduct of aniline.

6. The process of claim 4 wherein said polyol is a propylene oxide or mixed ethylene oxide/propylene oxide adduct of aniline.

* * * * *